(12) United States Patent
Thüringer et al.

(10) Patent No.: US 6,498,404 B1
(45) Date of Patent: *Dec. 24, 2002

(54) DATA CARRIER WITH OBSCURED POWER CONSUMPTION

(75) Inventors: Peter Thüringer, Graz (AT); Klaus Ully, Deutschlandsberg (AT); Siegfried Arnold, Graz (AT); Wolfgang Eber, Graz (AT)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/582,802

(22) PCT Filed: Oct. 28, 1999

(86) PCT No.: PCT/EP99/08331

§ 371 (c)(1),
(2), (4) Date: Jun. 30, 2000

(87) PCT Pub. No.: WO00/26746

PCT Pub. Date: May 11, 2000

(30) Foreign Application Priority Data

Nov. 3, 1998 (DE) .......................................... 198 50 721

(51) Int. Cl.[7] .................................................. H02J 1/00
(52) U.S. Cl. .............................. 307/32; 307/31; 307/38; 307/41; 365/228; 713/193
(58) Field of Search .............................. 307/31, 32, 38, 307/41; 365/228; 710/193

(56) References Cited

U.S. PATENT DOCUMENTS 4,916,333 A * 4/1990 Kowalski .................. 307/296.5
4,932,053 A * 6/1990 Fruhauf et al. ................. 380/4

* cited by examiner

Primary Examiner—Stephen W. Jackson
Assistant Examiner—Robert L. Deberadinis
(74) Attorney, Agent, or Firm—Daniel J. Piotrowski

(57) ABSTRACT

In order to prevent the retrieval of data via the measurement of the power consumption in a data carrier provided with a data processing device, it is proposed to connect a load circuit to the power supply of the data carrier so as to influence the power consumption of the data carrier at least during security-relevant operations of the data processing device.

8 Claims, 1 Drawing Sheet

DATA CARRIER WITH OBSCURED POWER CONSUMPTION

BACKGROUND OF THE INVENTION

1. Field of the Invention

The invention relates to a data carrier with a data processing device as well as to an electronic component with a data processing device, for example for such a data carrier.

2. Description of the Related Art

Recently doubts have been raised as regards the security of data carriers, it being stipulated that security-relevant data could be determined by monitoring the power consumption of such data carriers. It is true that during all logic operations, so also during sensible operations or sub-operations (for example cryptographic calculations) current power is consumed by switching operations in the logic circuitry in dependence on the result or logic level. Measurement of the power consumed by the circuit, therefore, could be used for an attack so as to find out secret data (key) by means of mathematical methods (correlations, power analysis).

SUMMARY OF THE INVENTION

It is an object of the invention to prevent such attempts from being successful.

This object is achieved in that a load circuit is connected to the power supply of the data carrier and is intended to influence the power consumption of the data carrier at least during security-relevant operations of the data processing device.

The power consumption that can be measured externally thus no longer corresponds to the power consumption of the data processing device alone, but also contains a further component which preferably is not directly related to the internal operations of the data processing device.

A particularly simple embodiment is obtained when the load circuit is constructed as a variable ballast resistor which in the simplest case may consist of a transistor or a network of series and parallel-connected transistors, connected to the same power supply lead in parallel with the data processing device. Different load states can be adjusted by appropriate control of the load resistor or load resistors.

A more complex embodiment is provided with a circuit arrangement which is constructed so as to be complementary to at least parts of the data processing device and can be controlled in parallel with the data processing device. Changes in the switching state, initiated during security-relevant operations, are thus carried out in a complementary fashion at the same time. Even if the power consumption should be different for different logic levels, in the ideal case the power consumption is constant because of the complementary switching states. However, because it cannot be detected from the outside what power consumption relates to the logic states actually involved in the security-relevant operations and what power consumption is involved in the complementary switching states which occur in parallel merely for the purpose of masking, it is not even necessary to pursue a constant power consumption. Therefore, it is not even necessary to construct all switching circuit components required for the security-relevant operations in a complementary fashion, but it suffices to make only a part of the circuit components complementary.

Preferably, the load circuit and the data processing device are integrated in a common circuit because the separation of the load circuit from the data processing data for the purpose of attempted discovery requires far more technical means than when these circuit components are arranged on the data carrier in a physically separated manner. The analysis of circuit elements actually involved in security-relevant operations is rendered more complicated notably when the circuit elements required are physically mixed with complementary circuit elements in one chip.

The invention will be described in detail hereinafter.

DETAILED DESCRIPTION OF THE PREFERRED EMBODIMENTS

The invention is used, for example in so-called chip cards 1 or integrated circuits 3 (chip card chips) for such chip cards. Different constructions (for example SIM card, secure access model for a terminal, contactless or dual interface transponders) are feasible, the power supply being possible via contacts 2, in a contactless manner, for example by induction of alternating current, or also by means of internal power supply sources such as rechargeable batteries. Therefore, the invention is suitable for any type of power supply. If the invention is incorporated in the relevant chip, usable information cannot be extracted either by a deliberate attempt aimed at the power supply provided within a chip card.

Figure 1:
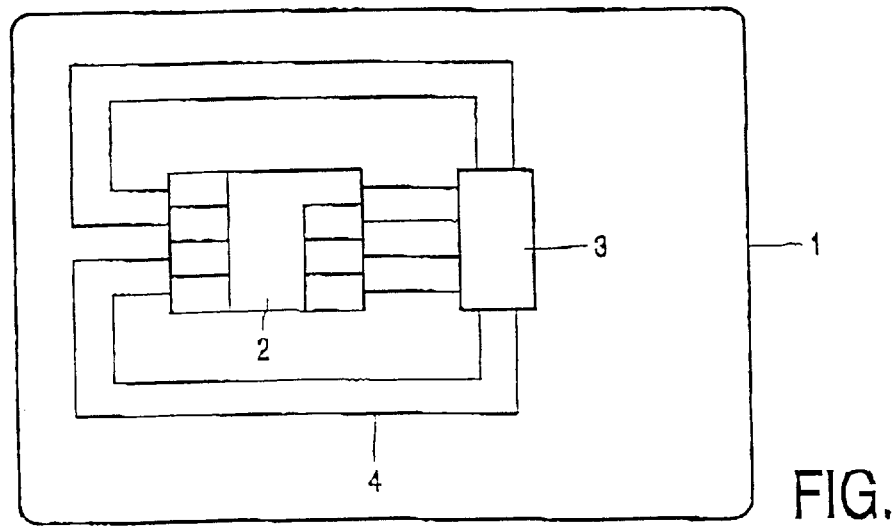
FIG. 1 shows a chip card having an embedded chip connected by a contact field by wires.

FIG. 1 shows such a chip card 1 with an embedded chip 3 which is connected to a contact field 2 by internal wires 4.

Figure 2:
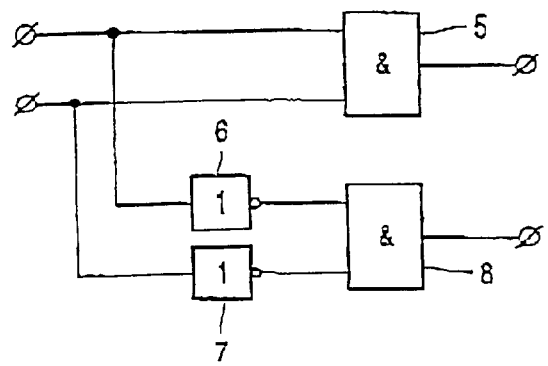
FIG. 2 illustrates an embodiment providing complementary copies of logic circuits.

Generally speaking, it would also be possible to construct all logic elements of a chip as a complementary copy. As an example for all logical elements of a chip FIG. 2 shows a first AND-gate 5. The inputs of this AND-gate 5 are connected, via logic inverters 6, 7, to a second AND-gate 8 which forms the complementary gate and acts as a supplementary load. Preferably, delay elements are inserted in the input lines of the fist AND-gate 5 in order to compensate the signal delay of the inverters 6, 7. As the output of the first AND-gate 5 switches to logic "1" when both of its inputs are logic "1" and the output of the second AND-gate 8 switches to "1" when the inputs of the first AND-gate are all of logic value "0", it cannot be recognized from outside if switching occurs when all the inputs of the first AND-gate 5 are set to "0" or are set to "1". If a third and a fourth AND-gate were added parallel to the first and second AND-gate with a single inverter connected in-between one of the inputs, exactly one of those four AND-gates would switch every time when one of the logic values of the inputs changes. Because chips in a chip card are exposed to mechanical loads, however, they should not exceed a given size. Therefore, it is considered to be sufficient if only the logic elements which execute sensitive operations are constructed so as to be complementary. Two alternatives seem to be attractive for copying. On the one hand, security-relevant circuit elements, being of interest to a fraud because of the power consumption, can actually be provided on the chip in complementary logic so as to be controlled in parallel. For example, if during the calculation of a cryptogram, during which a secret in the form of a key which is unknown to the fraud is input, a logic level becomes high on a node at a given instant, be it random during the calculation (the previous state may have been low or high), in the complementary logic the state low is generated at the comparable node (the immediately previous state was high or low).

Consequently, for sensitive operations the number of low-high transitions and the number of high-low transitions are exactly equal and the number of nodes which are high at a given instant corresponds exactly to the number of nodes which are low. The surface area required by the complementary logic corresponds exactly to the surface area required by the copied logic.

On the other hand, it is also possible to realize a complementary machine which copies all logic combinations, be it not identical, by the switching of different load states.

Figure 3:
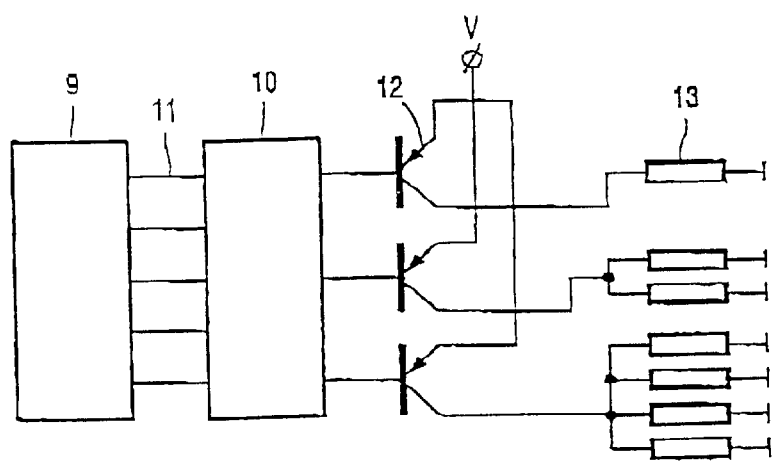
FIG. 3 illustrates a complementary machine connected to nodes of security-related circuit elements performing the calculation of a cryptogram.

FIG. 3 shows a complementary machine 10 which is connected, via wires 10, to nodes of security-related circuit elements of parts 9 of the chip performing the calculation of the cryptogram. In relation to the states of the sensored nodes, the complementary machine 10 calculates an appropriate load and switches, via switching transistors 12, the calculated number of load resistors 13.

This step is aimed at the generating of a power consumption which is independent of the data or the key but not necessarily constant, in order to achieve resistance against attacks which utilize the power consumption as a starting point (simple or differential power analysis). In any case the object is not to achieve a constant power consumption of the circuit by complex control concepts.

This concept can be realized independently of the construction of the logic (synchronous or asynchronous circuit technique).

What is claimed is:

1. A data carrier comprising:

a power supply;

a data processing device connected to said power supply, said data processing device including a plurality of logic circuits, a load circuit coupled to said power supply, said load circuit is configured for complementing power consumption of a portion of the plurality of logic circuits of said data processing device, wherein the power consumption of the data carrier is masked, at least during security-relevant operations of the data processing device, in dependence on the portion of the plurality of logic circuits involved.

2. A data carrier as claimed in claim 1, characterized in that the load circuit is formed by a variable load resistor.

3. A data carrier as claimed in claim 1, characterized in that a circuit arrangement which is constructed so as to be complementary to at least parts of the data processing device can be controlled in parallel with the data processing device.

4. A data carrier as claimed in claim 1, characterized in that the load circuit is constructed so as to be controllable by way of its own logic which is intended to generate a load state which is complementary to the power consumption of the data processing device.

5. An electronic component, that is integrated with a data processing device having a plurality of electronic components, wherein a load circuit which is internally connected to a power supply of the electronic component is arranged to mask the power consumption of the electronic component at least during security-relevant operations of the data processing device, in dependence on a portion of the plurality of electronic component involved.

6. An electronic component as claimed in claim 5, characterized in that the load circuit consists of a variable load resistor.

7. An electronic component as claimed in claim 5, characterized in that the load circuit is formed by a circuit arrangement which is constructed so as to be complementary with at least parts of the data processing device and can be controlled in parallel with the data processing device.

8. An electronic component as claimed in claim 5, characterized in that the load circuit can be controlled by means of its own logic which is arranged to produce a load state which is complementary to the power consumption of the data processing device.

* * * * *